United States Patent [19]
Manning

[11] Patent Number: 6,074,693
[45] Date of Patent: Jun. 13, 2000

[54] GLOBAL POSITIONING SYSTEM CONTROLLED PAINT SPRAYER

[75] Inventor: Charles David Hope Manning, Christchurch, New Zealand

[73] Assignee: Trimble Navigation Limited, Sunnyvale, Calif.

[21] Appl. No.: 09/255,424

[22] Filed: Feb. 22, 1999

[51] Int. Cl.$^7$ .............................. B05C 1/16; E01C 23/16
[52] U.S. Cl. ......................... 427/137; 427/136; 427/421; 118/697; 404/84.05; 404/93
[58] Field of Search ................... 427/421, 136, 427/137; 118/305, 697; 404/84.05, 75, 93, 94

[56] References Cited

U.S. PATENT DOCUMENTS

| | | | |
|---|---|---|---|
| 4,219,092 | 8/1980 | Richter | 180/169 |
| 4,460,127 | 7/1984 | Hofmann | 239/126 |
| 4,832,331 | 5/1989 | Brandli | 272/3 |
| 5,220,876 | 6/1993 | Monson et al. | 111/130 |
| 5,296,256 | 3/1994 | Hartman | 427/10 |
| 5,549,412 | 8/1996 | Malone | 404/84.1 |
| 5,653,389 | 8/1997 | Henderson et al. | 239/69 |
| 5,746,539 | 5/1998 | Mara | 404/84.05 |
| 5,836,398 | 11/1998 | White | 169/24 |
| 5,838,277 | 11/1998 | Loomis et al. | 342/357 |

*Primary Examiner*—Shrive Beck
*Assistant Examiner*—Jennifer Calcagni
*Attorney, Agent, or Firm*—David R. Gildea

[57] ABSTRACT

A global positioning system (GPS) controlled paint spray system. The system includes a paint sprayer driver program and a GPS paint sprayer. The paint sprayer driver program enables a user of a standard drawing program using a standard personal computer to generate a print file for a drawing pattern. The GPS paint sprayer includes a GPS receiver, a geographical converter for enabling a user to convert the drawing pattern to geographical locations, a location comparator for detecting a location match between the geographical locations of the drawing pattern and a current GPS-based location, and a spray nozzle to spraying paint for matched locations.

19 Claims, 3 Drawing Sheets

GLOBAL POSITIONING SYSTEM CONTROLLED PAINT SPRAYER

BACKGROUND OF THE INVENTION

1. Field of the Invention

The invention relates generally to painting machinery and more particularly to a global positioning system (GPS) controlled marker for depositing marks according to GPS-based locations.

2. Description of the Prior Art

Road markings are produced to a great extent with the assistance of so called "road marking" machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material that emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like.

For athletic games between teams of individuals it is customary to provide certain markings with chalk, lime, or paint of the various portions of the field on which the game is played. It is common for teams to add drawings for their logos or for advertisers to add picture-like patterns to the fields. Athletics such as American football, soccer, rugby, and baseball, are held on the same field at different times but require different sideline markings as well as different markings within the paying field. Even athletic fields dedicated to one sport need to be re-surveyed and re-marked at intervals. Commonly, a tape measure and a rule book are used for marking such fields. However, this method can be inconvenient and time consuming and the accuracy of the markings will vary from time to time. In order to improve upon this method, many fields have installed permanent pegs or upright markers securely anchored to the ground in surveyed locations that can be used for sighting. However, the large number of markers and pegs for several different game markings can give the field a confused appearance and be hazardous. Furthermore, the uprights and pegs are of limited use for marking team logos or advertisements. The appearance can be improved and the hazard reduced by using removable uprights where only the anchor remains in place, however, this is of no benefit for picture-like patterns.

There is a need for a system for automating the marking of roads and fields that does not require light or electromagnetic beams, embedded materials, or upright sighting markers that is capable of marking lines and picture-like patterns.

SUMMARY OF THE INVENTION

It is therefore an object of the present invention to provide a system using a standard application program in a computer for generating a data file for a drawing pattern and a global positioning system (GPS) paint sprayer for automatically marking geographical locations accordingly. For a geographical information system (GIS) application program the system of the present invention uses the global positioning system for marking the geographical locations that are generated in the program. For a drawing application program a user uses the program as if he/she is printing on a page. The system of the present invention enables the user to convert the drawing pattern to geographical mark locations and then uses the global positioning system for automatically marking the geographical locations on a surface.

Briefly, in a preferred embodiment, the system of the present invention includes a standard application program and a paint sprayer driver program of the present invention in a standard computer; and a GPS paint sprayer of the present invention having a GPS receiver and a nozzle. The GPS paint sprayer includes a geographical drawing converter for converting an image of a drawing pattern to geographical mark locations and a location comparator for detecting a location match between the geographical mark locations of the drawing pattern and a current geographical location determined by the GPS receiver. Information for the location match is used for opening and closing the nozzle and controlling its position to correct fine location errors; by an autopilot for providing a steering signal for automatically steering the GPS paint sprayer; and by a display for displaying a location error left or right that can be used by an operator. It should be understood that although the present invention is described as a paint spray system, it could equally well be used as a system for depositing marks with other materials than paint, such as chalk, lime, or the like using a GPS controlled marker for that material.

An advantage of the present invention is that a standard drawing or GIS application program can be used with paint sprayer for automatically marking specified geographical locations on a surface for lines or a picture-like pattern.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
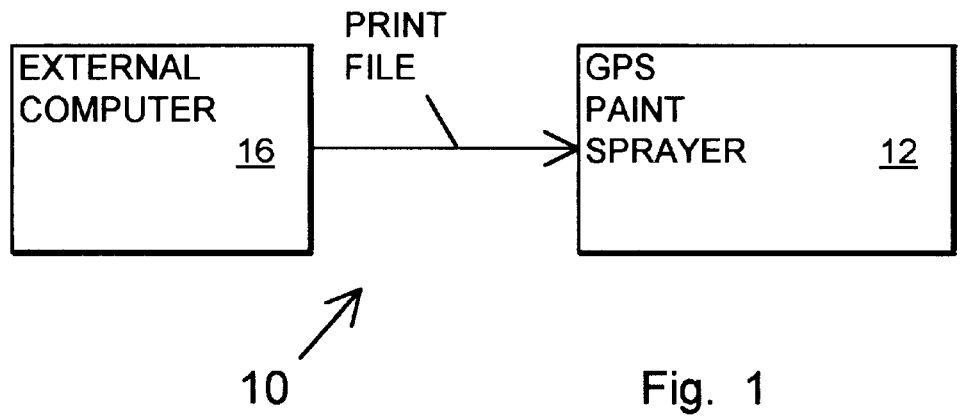
FIG. 1 is a block diagram of a GPS paint sprayer system of the present invention including a GPS paint sprayer and an external computer.

FIG. 1 is a block diagram of a global positioning system (GPS) paint spray system of the present invention referred to by the general reference number 10. The system 10 includes a GPS paint sprayer 12 including a GPS receiver 14 (FIG. 4) and an external computer 16 including an application program 18 (FIG. 2) for generating a paint or other drawing pattern. The external computer 16 provides a print file having data corresponding to the color and intensity of a drawing pattern on a transportable medium such as a floppy disk or through a direct connection to the GPS paint sprayer 12. The GPS paint sprayer 12 or the external computer 16 converts the locations of paint in the drawing pattern to geographical mark locations. The GPS paint sprayer 12 sprays paint when a GPS-based location of the paint sprayer 12 matches one of the geographical mark locations.

Figure 2:
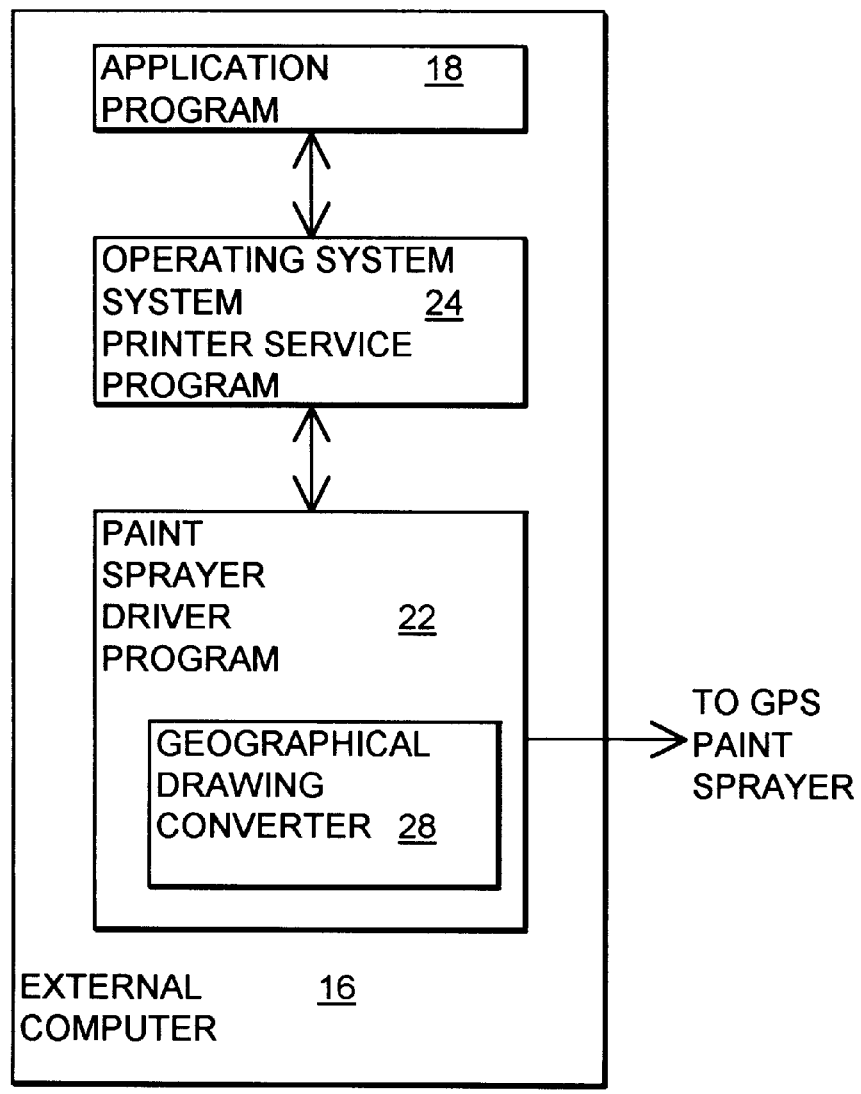
FIG. 2 is a block diagram of the external computer of the system of FIG. 1.

FIG. 2 is a block diagram of the external computer 16 including a paint sprayer driver program 22 of the present invention. Preferably, the external computer 16 is a standard personal computer, such as an Apple Macintosh, a Microsoft Windows type PC, a computer using a UNIX operating system, or the like, having a conventional operating system printer service program 24 and loaded with the application program 18 that is available from some other source and the paint sprayer driver program 22 of the present invention. A person identified herein as a designer uses the application program 18 to generate a drawing having pixels that are an image of the desired geographical drawing pattern. The application program 18 may be a commercially available drawing program, such as Corel Draw by Corel Corporation of Ottawa, Canada, AutoCAD by Autodesk, Inc. of San Rafael, Calif., Microsoft Paint by Microsoft Corporation of Redmond, Wash., or the like; or a commercially available Geographical Information Systems program such as InRoads by Intergraph of Corporation of Huntsville, Ala. The paint sprayer driver program 22 converts data for the drawing pattern generated by the application program 18 and processed by the operating system service program 24 into the print file in a form that can be understood by the GPS paint sprayer 12 in a similar manner to a printer driver for a desktop printer of a specific brand or a fax/modem driver for a computer fax/modem.

The operating system service program 24 provides a buffer layer between the application program 18 and the paint sprayer driver program 22 and performs generic image manipulation such as color and/or gray scale mapping using the information returned from the paint sprayer driver program 22. The paint sprayer driver program 22 includes a filter for removing parts of a drawing image such as borders and title blocks. Optionally, the paint sprayer driver program 22 includes a geographical drawing converter 28 that may be used for tying the pixel data in the drawing image to geographical coordinates. For a picture-like drawing pattern such as a logo the designer selects a reference geographical location for the center of the logo, a scale for the size of the logo, and an orientation for the azimuthal line from the center to the top or other distinguishing aspect of the logo. Alternatively, the designer could specify geographical locations for corners of the logo or scale the logo differently in one dimension than in the other. For a linear drawing pattern such as a road marking, the designer selects geographical locations for end points of a line, or an equation using known geographical location coordinates as independent variables. For example, a drawing pattern for parking lot or a roadway would use the geographical coordinates that are already known from a previous survey. Alternatively, for a curved line the designer selects the end points and a radius. Several line segments may be joined to make a relatively long continuous painted line. Of course, the geographical mark locations can be vertical for marking a wall.

When the designer selects "print", "draw", or the equivalent in the application program 18, the application program 18 passes a data file for the drawing pattern to the operating system service program 24. The operating system service program 24 then calls the paint sprayer driver program 22. The paint sprayer driver program 22 then prompts the designer by causing the external computer 16 to display an initialization dialog menu. The initialization dialog menu enables the designer to make the following selections:

Continuous lines or discrete spots. The continuous line mode would typically be selected for painting lines on a road, airfield, or parking lot. The discrete spot mode would typically be selected for painting a logo or alphanumeric characters. The continuous line mode instructs operating system service program 24 to provide the image of the drawing pattern as vector data. The discrete spot mode instructs the operating system service program 24 for providing the image of the drawing pattern as raster data.

Colors. The colors inform the operating system service program 24 of the colors that are available for color mapping and/or gray scale conversion and are passed to the GPS paint sprayer 12 to instruct a person who is to operate the paint sprayer 12 as to the colors and quantities for each of the colors that must be loaded. Instructions to the paint spray operator for sheen, viscosity, thinning, and/or specific paint by manufacturer and model number can be included.

Dithering on or off. A dithering mode instructs the operating system service program 24 to match colors exactly by applying two paint colors, such as yellow and blue to obtain green.

Geographical conversion fixed, selected, or deferred. A fixed geographical conversion uses geographical coordinates that are pre-determined in the application program 18 such as a road design program providing geographical data from a survey for the road. A selected geographical conversion enables the designer to use the geographical drawing converter 28 in the external computer 16 to select the geographical coordinates of the drawing pattern. Typically, a designer would select the geographical coordinates of the drawing pattern in the external computer 16 for a specific road, parking lot, or architectural plot where GPS-based or the equivalent location information was available to the designer. A deferred geographical conversion defers the selection of the geographical coordinates of the drawing pattern to the GPS paint sprayer 12 on-site. For example, geographical locations for a sports field marking, a logo, or an advertisement that is intended for use in several locations would typically be deferred to on-site selection in the GPS paint sprayer 12 using the GPS receiver 14.

Geographical coordinates. The geographical coordinates for a reference location, a scale, and an orientation for the desired drawing pattern may be fixed, selected, or deferred independently using the geographical drawing converter 28 in the external computer 16. For example, the designer may completely specify the space of the drawing by selecting all three of the reference location, scale, and orientation; or he/she may select the scale and defer the reference location and orientation.

Raster pattern. The driving pattern of a raster scan of the desired drawing pattern may be determined using the geographical drawing converter 28 in the external computer 16. The raster scan lines may include the loopback paths for connecting the ends of the raster lines in the desired geographical drawing pattern.

Draft or High Resolution. The high resolution mode uses data for every pixel for the image created by the application program 18. The draft mode reduces the amount of data that must be processed by not printing all pixels.

Special operator notes. Special instructions to the paint spray operator such as please paint with water soluble lime paint, do not travel faster than 3 mph, or a name and/or phone number to call for problems.

Figure 3:
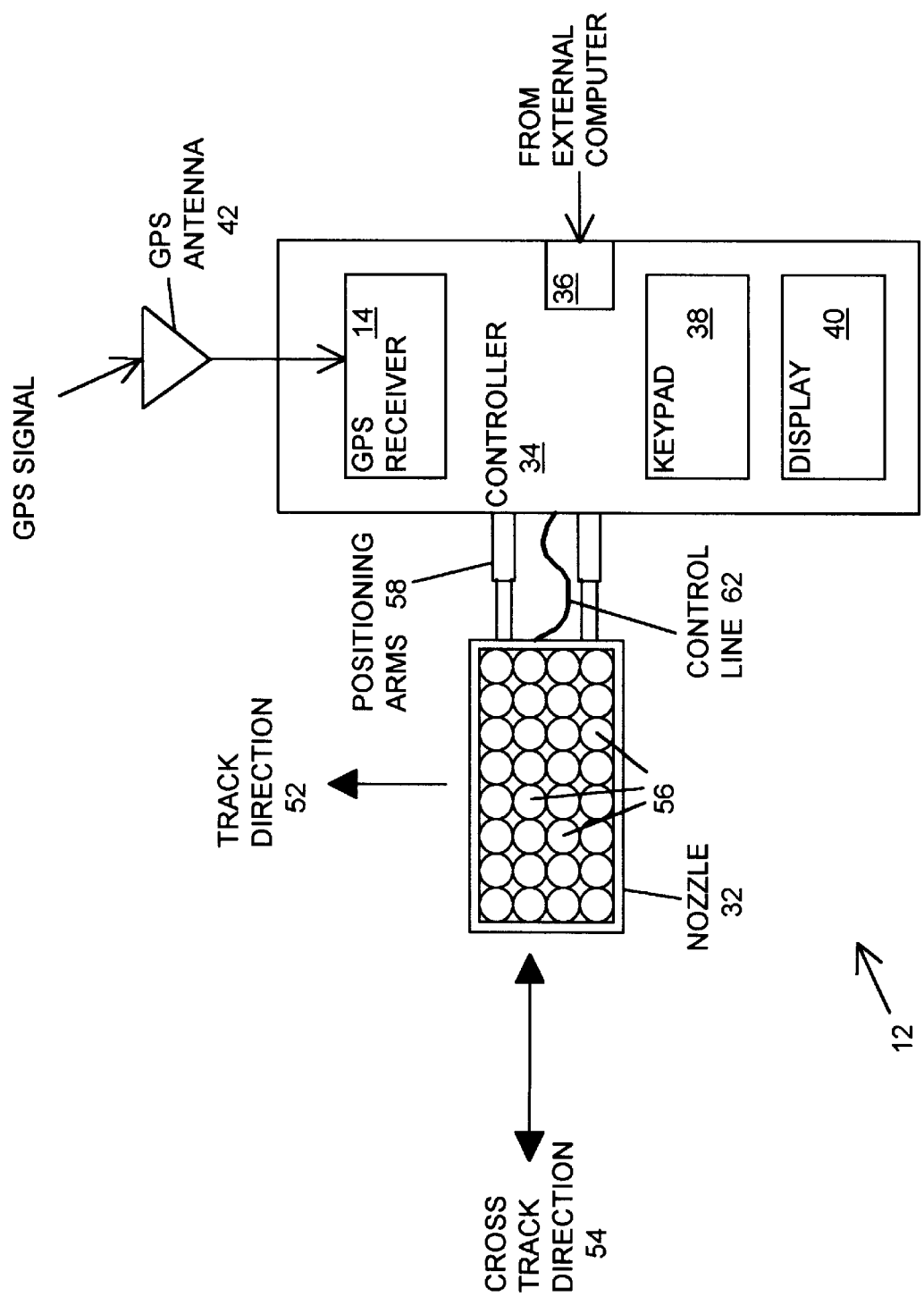
FIG. 3 is a pictorial drawing of the GPS paint sprayer of FIG. 1.

FIG. 3 is a pictorial drawing of the GPS paint sprayer 12 including a nozzle 32 and a controller 34. Preferably, the nozzle 32 is constructed for spraying paint. However, in an alternative, the nozzle 32 may be constructed for depositing chalk, lime, or other marking material. The controller 34 includes a computer data interface 36, a keypad 38, a display 40, and the GPS receiver 14. The GPS receiver 14 connects to a GPS antenna 42. The GPS antenna 42 receives an airwave GPS signal including location-determination information from one or more GPS satellites or GPS pseudolites and passes the GPS signal in a conducted form to the GPS receiver 14. The GPS receiver 14 uses the location-determination information in the GPS signal for determining a GPS-based location for the GPS antenna 42. Data in the form of a print file for the drawing pattern is received from the external computer 16 (FIG. 1) through the computer data interface 36. The paint spray operator enters information to the controller 34 through the keypad 38 and receives information from the display 40.

The GPS paint sprayer 12 has a track direction 52 for a direction of travel for laying down a line of paint such as a highway center line or a raster line in a logo on a field and a cross track direction 54 across the track direction 52. Preferably, the GPS paint sprayer 12 is mounted and carried on a vehicle and the vehicle is steered for traveling in the track direction 52. The nozzle 32 includes individual spray jets several of which are illustrated with a reference number 56. Extensible positioning arms 58 move the nozzle 32 in the cross track direction 54 in order to compensate for fine errors in the location of the nozzle 32 and to select a particular one of the spray jets 56. The display 40 on the controller 34 indicates a left or right cross track error in the location of the nozzle 12 in order to aid the paint spray operator in steering the vehicle. A flexible control line 62 carries a control signal to the nozzle 32. The nozzle 32 uses the control signal for opening a particular one of the spray jets 56 that is indicated. Paint reservoirs (not shown) hold and supply paints to the nozzle 32. For marking a roadway, certain specialized paints having reflective fillings are sometimes used. For marking a sports field chalk or lime may be used in place of paint. Of course, the nozzle 32 and the spray jets 56 would need to be constructed in an appropriate manner depending upon the specific material that was to be used for marking. The vehicle for marking a roadway is typically a motor vehicle. The vehicle for a field is typically a manual push carrier or a golf cart like apparatus.

Figure 4:
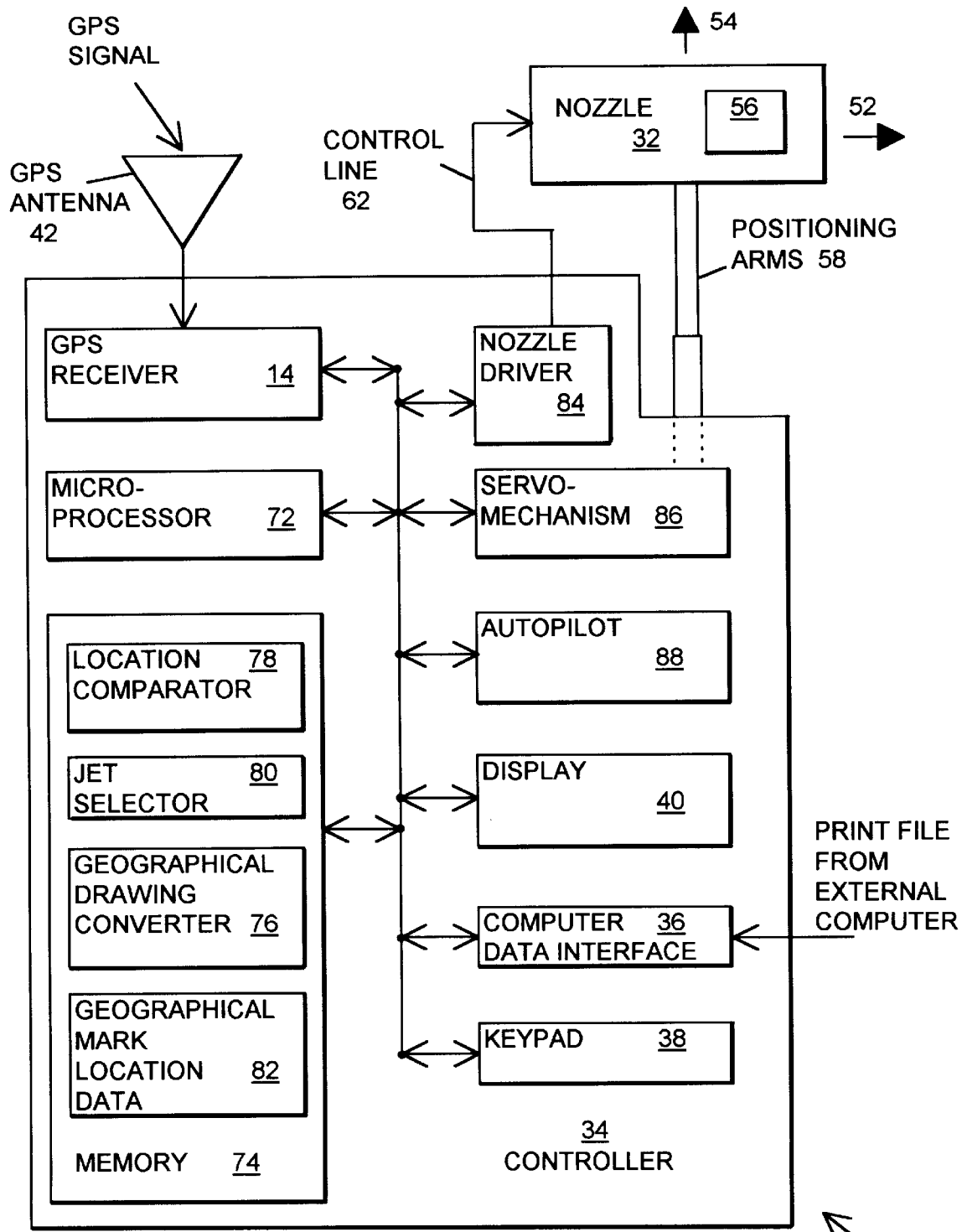
FIG. 4 is a block diagram of the GPS paint sprayer of FIG. 1.

FIG. 4 is a block diagram of the global positioning system (GPS) paint sprayer 12 of the present invention including the GPS receiver 14, the GPS antenna 42, the nozzle 32, the spray jets 56, the positioning arms 58, the control line 62, and the controller 34 described above. The controller 34 includes a microprocessor 72 and a memory 74. The memory 74 includes data and program codes having executable instructions. The microprocessor 72 operates in a conventional manner for executing the instructions in the program codes, reading and writing the data, and issuing and receiving signals to and from the structural elements of the controller 34. The program codes in the memory 74 include codes for an optional geographical drawing converter 76, a location comparator 78, and a jet selector 80.

The geographical drawing converter 76 includes instructions for using geographical location information received from the operator of the paint sprayer 12 through the keypad 38 for converting the print file received from the external computer 16 through the computer data interface 36 to geographical mark locations for the desired drawing pattern having the desired reference location, scale, and orientation for the pattern; and storing the geographical mark locations as geographical mark location data 82 in the memory 74. The location comparator 78 includes instructions for comparing the geographical mark location data 82 and current GPS-based location and detecting when there is a match between the current GPS-based location and one of the data points in the geographical mark location data 82. When a match is detected the location comparator 78 directs the microprocessor 72 for providing the control signal through a nozzle driver 84 over the control line 62 to the nozzle 32.

The jet selector 80 includes data for a color table having data for the position offsets of the respective spray jets 56 in the track direction 52 and the cross track direction 54 as compared to the GPS antenna 42. Preferably, the GPS antenna 42 is fixedly mounted on the controller 34 and the position offsets in the cross track direction 54 include the effect of the current extension of the positioning arms 58. Alternatively, the GPS antenna 42 may be mounted on the nozzle 32, whereby the effect of the current extension of the positioning arms 52 is not required. The operator of the paint sprayer 12 loads the desired colors into the respective spray jets 56 or their reservoirs and then indicates the arrangement of the colors for the respective spray jets 56 through the keypad 38 for storage in the color table. As a part of the process of detecting the location match, the location comparator 78 uses coding in the jet selector 80 for adjusting either the current GPS-based location or the geographical mark location data 82 according to the color table for the position offsets in the track direction 52 and the cross track direction 54.

The location comparator 78 includes instructions for determining a track line in the track direction 52 from one or more adjacent data points in a raster or vector line for the geographical mark location data 82. As the current GPS-based location moves along of the track line, the location comparator 78 determines a distance in the cross track direction 54 between the GPS-based location and the track line; and issues an indicative cross track error signal. The controller 34 includes a servomechanism 86 for receiving the cross track error signal for controlling the positioning arms 58 for correcting for cross track error within the variable range of the arms 58. The display 40 provides the paint spray operator with a right or left indication in response to the cross track error signal for a steering aid. Preferably, the controller 34 includes an autopilot 88 for receiving the cross track error signal and providing a steering signal for automatically steering a vehicle carrying the GPS paint sprayer 12 back onto the track line toward the geographical location for the next data point in the geographical mark location data 82.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for geographically marking a drawing pattern, comprising steps of:
   determining a global positioning system (GPS)-based location of a nozzle;
   receiving print data for a drawing pattern;
   using a geographical reference location for converting said print data to geographical mark locations corresponding to said drawing pattern;
   detecting a location match when said GPS-based location matches one of said geographical mark locations; and
   depositing a marking material onto a surface from said nozzle when said location match is detected.

2. The method of claim 1, wherein:
   said nozzle includes a spray jet for spraying paint.

3. The method of claim 1, wherein:
   the step of using said geographical reference location for converting said print data to said geographical mark locations includes steps of receiving said print data for printing said drawing pattern on a page; and determining said geographical reference location for said drawing pattern.

4. The method of claim 1, wherein:
   said drawing pattern has a track direction for a line; and further including a step of:
      determining a cross track offset between said GPS-based location and said geographical mark locations.

5. The method of claim 4, further comprising steps of:
   carrying said nozzle in said track direction; and
   mechanically moving said nozzle a cross track direction for correcting said cross track offset as said nozzle is carried.

6. The method of claim 4, further comprising steps of:
   carrying said nozzle on a vehicle in said track direction; and
   providing a steering signal for automatically steering said vehicle toward a next of said geographical mark locations.

7. The method of claim 1, wherein:
   said nozzle includes two or more spray jets having respective position offsets; and the step of detecting said location match includes a step of automatically positioning said nozzle for compensating for said position offsets.

8. The method of claim 1, wherein:
   said surface is selected from the group consisting of a field, a road, a parking lot, a wall, and an architectural plot.

9. The method of claim 3, further comprising a step of:
   receiving geographical information for said geographical reference location, a geographical scale, and a geographical orientation; and wherein:
      the step of using a geographical reference location for determining geographical mark locations includes a steps of using said scale and said orientation for converting said print data to said geographical mark locations.

10. The method of claim 3, further comprising a step of:
    receiving geographical information for corners of a geographical area; and wherein:
       the step of using a geographical reference location for determining geographical mark locations includes using said corners of said geographical area for converting said print data to said geographical mark locations.

11. A global positioning system (GPS) marker, comprising:
    a nozzle for depositing a marking material when commanded by a control signal;
    a data interface for receiving print data for a drawing pattern;
    a GPS receiver for determining a GPS-based location of said nozzle;
    a geographical drawing converter for using a geographical reference location for converting said print data to geographical mark locations: and
    a location comparator for detecting a location match when said GPS-based location matches one of said geographical mark locations and generating said control signal when said location match is detected.

12. The marker of claim 11, wherein:
    the nozzle includes a spray jet for spraying paint.

13. The marker of claim 11, further comprising:
    a user interface for receiving information for said geographical reference location; and wherein:
       said print data is for printing said drawing pattern on a page.

14. The marker of claim 11, wherein:
    said drawing pattern has a track direction; and
    the location comparator is further for determining a cross track offset between said GPS-based location and said one of said geographical mark locations.

15. The marker of claim 14, further comprising:
    a servomechanism for mechanically moving said nozzle in a cross track direction for correcting said cross track offset as said nozzle is carried in said track direction.

16. The marker of claim 14, further comprising:
    an autopilot for using said cross track offset for steering a vehicle toward a next of said geographical mark locations.

17. The marker of claim 11, wherein:
    said nozzle includes two or more spray jets having respective position offsets;
    the location comparator includes a jet selector for selecting a particular one of said spray jets having a particular position offset; and further comprising:
    a servomechanism for automatically positioning said nozzle for compensating for said particular position offset.

18. The marker of claim 13, wherein:
    the user interface is further for receiving information for a geographical scale and a geographical orientation; and
    the geographical converter is further for using said scale and said orientation for converting said print data to said geographical mark locations.

19. The marker of claim 13, wherein:
    the user interface is further for receiving information for corners of a geographical area; and
    the geographical converter is further for using said corners of a geographical area for converting said print data to said geographical mark locations.

* * * * *